United States Patent

[11] 3,590,359

| [72] | Inventors | Hans Jurg Bossi<br>Nussbaumen;<br>Manfred Quissek, Villigen, both of,<br>Switzerland |
|---|---|---|
| [21] | Appl. No. | 882,643 |
| [22] | Filed | Dec. 5, 1969 |
| [45] | Patented | June 29, 1971 |
| [73] | Assignee | Aktiengesellschaft Brown, Boveri & Cie.<br>Baden, Switzerland |
| [32] | Priority | Dec. 24, 1968 |
| [33] | | Switzerland |
| [31] | | 19233/68 |

[54] CURRENT CONVERTER FOR TRANSFORMING THREE-PHASE ALTERNATING CURRENT INTO DIRECT CURRENT
3 Claims, 2 Drawing Figs.

| [52] | U.S. Cl. | 321/8 |
|---|---|---|
| [51] | Int. Cl. | H02m 7/06 |
| [50] | Field of Search | 321/5, 8 |

[56] References Cited
UNITED STATES PATENTS

| 3,223,901 | 12/1965 | Riley | 321/8 X |
|---|---|---|---|
| 3,289,068 | 11/1966 | Healis | 321/8 |
| 3,460,022 | 8/1969 | Riley | 321/8 |

*Primary Examiner* — William M. Shoop, Jr.
*Attorney* — Pierce, Scheffler & Parker ABSTRACT: A current converter for converting three-phase alternating current into direct current, or vice versa, includes for each phase an AC bus bar, a DC shunt bus bar and a plurality of current converter valves carried by and distributed uniformly along the AC bus bar. The current converter valves are connected electrically in parallel between the AC and DC bus bars of each phase, and the DC bus bars of all three phases are interconnected at each end thereof by conductor paths which have an ohmic resistance (as measured between valve junctions nearest to the associated junction on the DC bus bars associated with two different phases) which is always less than one-fifth of the ohmic resistance of one bus bar (as measured between the outermost positioned valves on the bus bar). Also the distance between the centerline of an AC junction on the AC bus bar and the outermost valve junction thereon (nearest to the direct current terminal structure formed from the interconnection at one end of the DC bus bars) amounts to from 60 to 75 percent of the distance between the two outermost valve junctions on the AC bus bar.

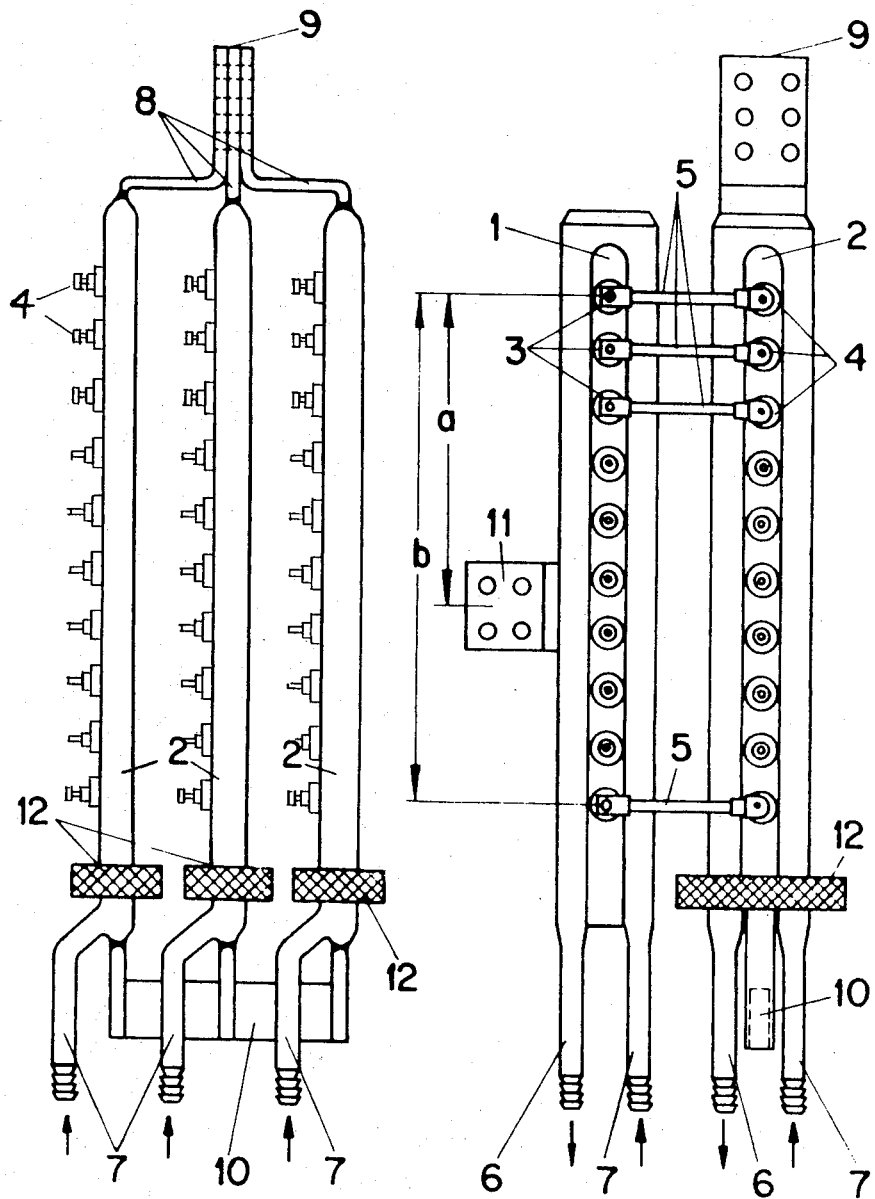

3,590,359

CURRENT CONVERTER FOR TRANSFORMING THREE-PHASE ALTERNATING CURRENT INTO DIRECT CURRENT

The present invention relates to a current converter arrangement for transforming three-phase alternating current into direct current, or vice versa, in which several current converter valves are mounted in parallel per AC phase between a current feed bus bar and a current shunt bus bar along effective sections of these bus bars and in a substantially uniform distribution on the bus bars.

With such current converter arrangements with several current converter valves arranged electrically and spacially in parallel on the bus bars, the current distribution to the individual valves is not uniform. The reason is that the current paths associated with the various valves have different lengths and carry different current intensities in different sections. The phase-to-phase commutation occurring in three-phase current rectification does not take place instantaneously, but the current flow rise of each valve of the phase which takes over the flow of the current, is determined by the totality of the inductances of the connections between this valve and the valves of the particular phase which is then yielding the current flow.

Owing to the differences of these inductances, there results, for the different valves, different current rise velocities and this causes a further scattering of the mean values of the currents carried by the individual valves.

Swiss Pat. No. 414,832 discloses a current converter arrangement with two current converter groups in smoothing choke arrangement, in which on the direct current (DC) side, current shunt bars of corresponding phases of both current converter groups are always connected in series, and the bus bar series circuits thus formed are interconnected at their ends.

In this known circuit, in order to accomplish as uniform a current distribution to the valves as possible, the direct current is taken symmetrically from both connecting junctions of the shunt bus bar series circuit, and the location of the connections of the alternating current (AC) feed bus bars is so selected that these bus bars are divided into two sections so that the ratio between the lengths of these sections is inversely proportional to the ratio of the conductor loops, containing these sections, between the AC junctions of two phases.

However, this known arrangement has the drawback that the removal of the direct current must be effected at spacially different points. In addition, it is suitable only for a current converter arrangement in a suction choke circuit.

The present invention has for its principal objects the provision of a current converter arrangement for transforming three-phase current into direct current and vice versa, in which these drawbacks are avoided.

The current converter arrangement according to the invention is characterized in that the direct current shunt bus bars are interconnected at their ends by conductor paths, the ohmic resistances of which between the valve junctions nearest to the associated junction on the direct current shunt bus bars associated with two different phases are always smaller than one-fifth of the ohmic resistance of one direct current shunt bus bar or one alternating current feed bar, measured between its outermost valve junctions, that a common direct current leadoff terminal is arranged at one of the junctions of the ends of the direct current shunt bus bars, and that the distance between the centerline of the alternating current junction on the current feed bus bar and the outermost valve junction nearest to the direct current leadoff terminal amounts to 60—75 percent of the distance between two outermost valve junctions on this bus bar.

A preferred embodiment of the invention will now be described and is illustrated on the accompanying drawings wherein:

FIG. 1 is a view of a water-cooled three-phase converter arrangement in said elevation; and FIG. 2 is a view of the same arrangement in end elevation.

With reference now to the drawings, the arrangement has, in parallel per phase (FIG. 2), an AC current feed bus bar 1 and a DC current shunt bus bar 2. Distributed uniformly over an effective bus bar section of the current feed bus bar 1 are many semiconductor valves 3, (in the present embodiment 10, and the current shunt bus bar 2 is provided with an equal number of securing elements 4, associated respectively with these semiconductor valves. In order to produce a parallel circuit between the current feed bus bar 1 and the current shunt bus bar 2, the semiconductor valves 3 which are connected thermally and electrically conductively with their anode block to the current feed bus bar 1, are each connected at their cathode side through a conductive rod 5 to an associated securing element 4 on the current shunt bus bar 2. These current feed and shunt bars 1 and 2 are constructed as hollow profiles which terminate at their ends in pipe fittings 6, 7 for connection to a cooling system, not shown in the drawing.

The three current shunt bus bars 2, one each per phase, (FIG. 1) are provided at their upper ends with connecting plates 8 which are connected with a common direct current leadoff connecting terminals structure 9, whilst the lower ends of these bus bars, as viewed in the drawing, are all interconnected by a short circuit cross-strip 10. The connecting plates 8 and the short circuit strip 10 respectively are so dimensioned that the ohmic resistance of the conducting path leading over a link between the valve junctions nearest to this junction of two different current shunt bars 2 is smaller than one-fifth of the ohmic resistance of a current feed bus bar 1 or a current shunt bus bar 2, always measured between the two most remote valve junctions thereon.

Mounted on each current feed bus bar 1 (FIG. 2) is an alternating current connecting terminal 11 so that, on this bus bar, the distance $a$ between the centerline of this AC connection 11 and the valve junction on this bus bar nearest to the direct current leadoff point, is 60 to 75 percent of the distance $b$ between the two valve junctions of this bus bar which are furthest apart, i.e. the uppermost and lowermost junctions on the bus bar.

Due to the fact that in the described arrangement, the alternating current is not fed symmetrically into the center of the current feed bus bars, the inductances of the conductor loops, which determine during a commutation the current rise in the valves nearest to the direct current leadoff 9 would, without special measures, be larger than those of the conductor loops which determine the current rise of the valves, which are located on the parts of the current feed bus bars remote from the direct current leadoff 9.

In consequence, two semiconductor valves 3 arranged relative to the center of the current feed bus bar do not, generally, have the same current rise velocity. In order to compensate for this dissymmetry and to restrict thereby the maximum occurring current rise velocity, the end portions of the current shunt bus bars 2 remote from the direct current leadoff 9 and free from valve junctions, are provided with iron cores 12 in order to increase the inductances of the commutation loops extending over these ends.

In cases where this dissymmetry can be tolerated in the current rise velocities during operation, the iron cores 12 may be omitted in order to provide a more simplified construction.

In conclusion, while the invention has been described in relation to its application to a rectifier wherein alternating current fed to the bus bar 1 is rectified into direct current available on bus bar 2, it is obvious that the inventive concept is equally applicable to an inverter wherein direct current fed to the bus bar 2 is converted into three-phase alternating current available on the bus bars 2.

We claim:

1. In a current converter arrangement for converting three-phase alternating current into direct current, or vice versa wherein for each phase, current converter valves are connected electrically in parallel between an alternating current bus bar and a direct current shunt bus bar and are distributed along the bus bars in substantially uniformly spaced relation, the improvement wherein said direct current shunt bus bars are interconnected at each end thereof by conductor paths the respective ohmic resistances of which between the valve junctions nearest to the associated junction on the direct current shunt bus bars associated with two different phases are always smaller than one-fifth of the ohmic resistance of one direct current shunt bus bar or one alternating current bus bar as measured between the outermost valve junctions on said bus bars, wherein a direct current terminal structure common to all of said direct current shunt bus bars is established from the interconnecting conductor paths at one end of said direct current shunt bus bars, and wherein the distance between the centerline of an alternating current junction on an alternating current bus bar and the outermost valve junction thereon nearest to said direct current terminal structure amounts to from 60 to 75 percent of the distance between the two outermost valve junctions on said alternating current bus bar.

2. A current converter arrangement as defined in claim 1 wherein said conductor paths interconnecting said direct current shunt bus bars at the ends thereof opposite to the ends from which said common terminal structure is established are each enclosed by at least one annular iron core in order to increase their inductance.

3. A current converter arrangement as defined in claim 2 wherein said annular iron cores enclose an end portion of said direct current shunt bus bars which is free from current converter connections thereon.